Figure 1:
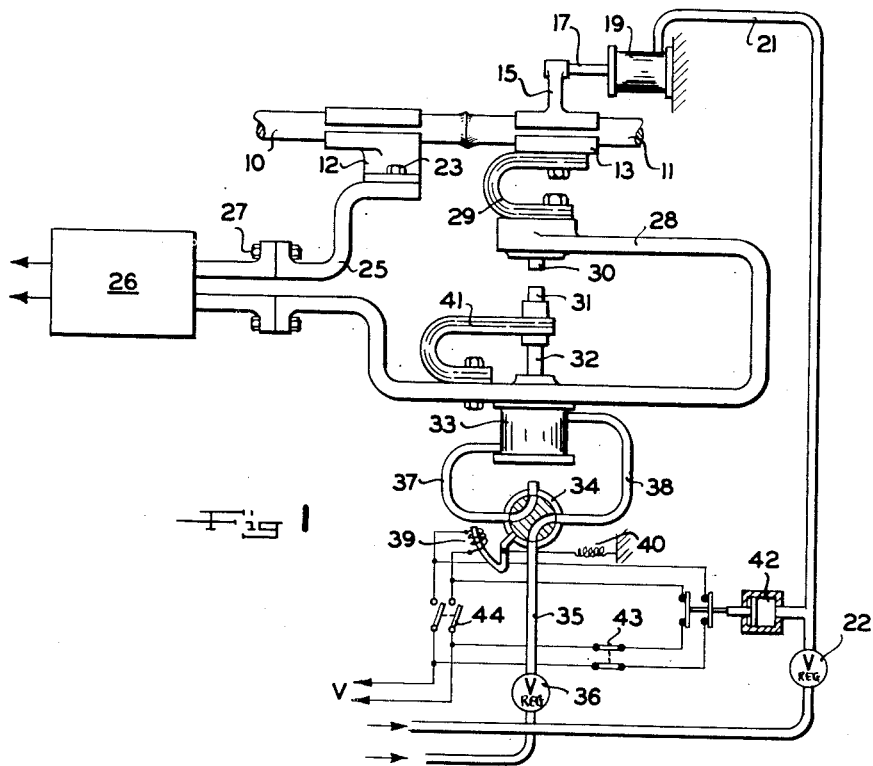

April 28, 1953 J. H. COOPER 2,636,965

FLASH WELDER WITH VARIABLE SECONDARY IMPEDANCE

Filed Sept. 6, 1951

INVENTOR
JOSEPH H. COOPER

BY *Francis J. Klempay*

ATTORNEY

Patented Apr. 28, 1953

2,636,965

UNITED STATES PATENT OFFICE 2,636,965

FLASH WELDER WITH VARIABLE SECONDARY IMPEDANCE

Joseph H. Cooper, Warren, Ohio, assignor to The Taylor-Winfield Corporation, Warren, Ohio, a corporation of Ohio Application September 6, 1951, Serial No. 245,355

15 Claims. (Cl. 219—4)

This invention relates to electric resistance flash-butt welders and more particularly to various improved mechanical and electrical features of welding machines of this type.

A principal object of this invention is the provision in a flash-butt welding machine of a novel method of controlling the welding current during the flashing and upset periods of the weld. More specifically it is an object of this invention to provide a novel mechanical means of altering the secondary impedance of the welding machine during the weld to thus accordingly control the flow of the welding current. In the flash-butt welding of various metals it is often desirable to vary the flow of current while the weld is in progress in order, for example, to provide a high starting current which is quickly reduced to a normal value, or to provide a normal starting and flashing current which is reduced materially during upset of the workpieces. Various other control combinations may be effected, through the use of the principles taught by the present invention.

Another object of this invention is the provision in welding apparatus of this type of a novel arrangement whereby normal impedance characteristics of the secondary circuit may be adjusted to any of various predetermined impedance values to best suit the current requirements of a particular operation. It will of course be understood that various well known types of electronic controls may be utilized to accurately regulate the flow of current during a welding operation. This type of equipment is usually quite elaborate, however, and is accordingly expensive; and, while such precise and sensitive control is occasionally necessary, there are many applications wherein a simple control device is sufficient. For example, many uses of flash-butt type welders involve mass production assemblies wherein a single repetitious operation is performed. For such use, a welding machine having once been pre-adjusted to deliver the proper rate of current flow, requires little if any subsequent adjustment. In other instances it may be desirable to occasionally change the nature of the repetitious operation, as for example, to compensate for alterations in design and/or size of the parts being welded. It will be understood that by the principles of my invention this may be accomplished by merely re-adjusting the normal impedance characteristics of the secondary circuit to a new value. Thus the present invention seeks to provide a simple, efficient and inexpensive control device for use particularly where repetitious operations are performed and where the expense of electronic controls is not warranted by the benefit derived therefrom.

The above and other objects and advantages of the invention will become apparent upon full consideration of the following detailed specification and accompanying drawing wherein there are disclosed certain preferred embodiments of my invention.

Figures 2, 3:
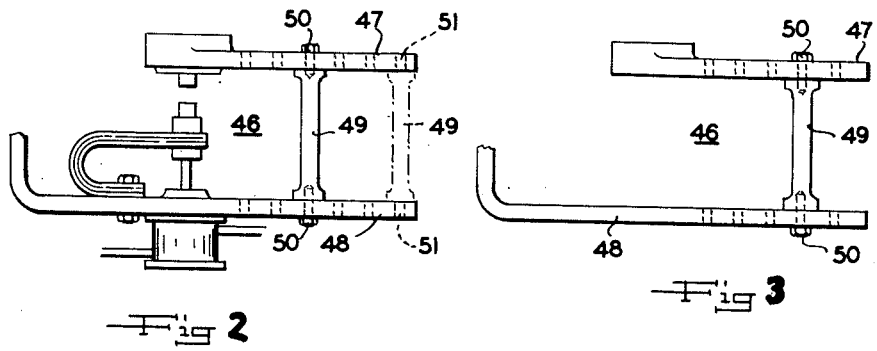

In the drawing:

Figure 1 is a schematic representation of a flash-butt type welding machine constructed according to the teachings of my invention; and Figures 2 and 3 are fragmentary views of modifications of the apparatus of Figure 1.

Referring to Figure 1 of the drawing, reference numerals 10 and 11 denote two work pieces, in the instant illustration cylindrical bars, which are in position to be welded. Hinged clamping members 12 and 13 serve to retain the work pieces 10 and 11 in proper alignment and also as contact members to conduct electrical current to the work pieces. Extending upwardly from the upper section of the clamping member 13 is an actuating arm 15 which is connected with the piston rod 17 of a hydraulic actuator 19. The hydraulic actuator 19 is connected through conduits 21 and regulating valve 22 to a suitable source of fluid, not shown, and is operative to advance the clamping member 13, and thus the work piece 11, as is required to satisfactorily perform the butt-welding operation. The mechanism and controls for effecting the proper work advance do not form a part of this invention and are accordingly omitted from this description.

Secured to the lower section of clamping member 12, by means of bolt 23, is a heavy bus bar conductor 25 which supplies welding current to the clamping member and thus to the workpiece 10. The conductor 25 is connected to one terminal of the secondary side of a welding transformer 26 by any suitable means, such as bolts 27, which facilitate quick disconnection of the apparatus for maintenance and repair.

Connecting the other terminal of the transformer secondary is a bus bar conductor 28 which is shaped into the form of a large loop as shown. A laminated flexible conductor 29 conventionally connects the bus bar 29 and the clamping member 13 to permit the required movement of the clamp during a welding opertaion. In accordance with the principles of the invention the bus bar 29 is shaped into the form of a loop in order to provide a desired impedance characteristic in the secondary circuit of the machine. The resulting characteristic is, of course, a function of the physical dimensions, which may accordingly be determined to satisfy the requirements of particular applications.

As explained, it is often desirable to obtain a high current flow during the starting and/or flashing portion of the weld cycle. To obtain this, however, it is requisite that the loop impedance be at least partially eliminated from the circuit as far as possible. For this purpose I have provided means of short-circuiting the looped portion of conductor 28. The said short-circuiting means includes a contact 30 which depends downwardly from the upper leg of the loop at its open end. A mating contact 31 is positioned below the contact 30 in axial alignment therewith and, according to the principles of my invention, is vertically movable. The movable contact 31 is attached to the piston rod 32 of a hydraulic actuator 33 which is secured to the lower leg of the looped conductor 28 and which is operative to move the contact 31 into and out of contact with the fixed contact member 30. A laminated flexible conductor 41 connects the movable contact 31 with the unlooped portion of conductor 28 to complete the short circuit caused by the closing of contacts 30 and 31. It is to be understood that the hydraulically operated actuator herein described is merely illustrative of the many types which may be utilized, i. e., pneumatic, solenoid, or cam actuated. The principal consideration being one of speed in operation to avoid excessive flashing and subsequent pitting of the contacts.

As means of motivating the hydraulic actuator 33 I may provide a four-way solenoid operated valve 34 which is connected to a source of hydraulic fluid through conduit 35 and valve 36 and which is connected to each end of the actuator 33 through conduits 37 and 38. A solenoid 39, when energized, positions the valve 34 to connect the supply conduit 35 with the upper end of the actuator 33 and thus causes the contacts 30 and 31 to remain open, forcing the current to flow through the high impedance loop of conductor 28. Deenergization of the solenoid 39 causes spring 40 to shift the valve 34 to connect the supply conduit 35 with the lower end of the actuator 33 to thus cause contacts 30 and 31 to close to thereby short-circuit the high impedance loop and permit the full flow of current through the weld pieces 10 and 11.

In the embodiment of my invention above described I have employed an automatic control means to energize and deenergize the valve solenoid 34 at the proper time. Since during the flashing period of the weld cycle the actuators 18 and 19 will be advancing slowly under low pressure, and since during the upset period a high pressure is utilized to quickly fuse the work pieces 10 and 11 together, I have provided a pressure responsive switch 42 which is connected to conduit 21 and which is adapted to operate in response to the application of the high fluid pressure utilized for the upset operation. It should be understood that during the flashing period, when high current flow is required, and when the actuator 19 is under low pressure, the pressure responsive switch 42 remains open and solenoid valve 34 assumes its deenergized position which connects supply conduit 35 with the lower end of the actuator 33 and thus retains contacts 30 and 31 in the closed or short-circuiting position, permitting the required high current flow to the weld. Upon the application of high pressure to the actuator 19, as is required for the upsetting operation, switch 42 closes, energizing solenoid 39 and causing valve 34 to shift the supply pressure to the upper end of the actuator 33 to thus separate the contacts 30 and 31 and cause the welding current to flow through the high impedance loop of conductor 28. The welding current is thus limited to the value prescribed for the upset portion of the cycle as determined by the characteristics of the impedance loop.

If manual control of the short-circuiting device be desired, switch 43 may be opened to isolate the pressure responsive switch 42 from the control circuit to thus permit control by a manual switch 44 or other suitable means. Such manual control, or other type of automatic control, may be desired in many applications, as for example when high current is required only for initially striking the arc or pre-heating the workpieces. Also, with some types of metals superior results are obtained when the upset operation is performed with full welding current flowing through the workpieces. It should be apparent, however, that the above and other variations and modifications in control procedure, where required, may be provided by one skilled in the electric resistance welding art.

In the modified embodiments of my invention shown in Figures 2 and 3 I have provided a secondary impedance loop 46 which comprises upper and lower bus bars 47 and 48 respectively which are connected by a transversely disposed conductor 49; the latter element being bolted securely at each end to the bus bars 47 and 48 by means of bolts 50. As shown in the drawing the bus bars 47 and 48 are provided with a plurality of longitudinally spaced holes 51 which are adapted to receive the bolts 50, and it will be apparent that the conductor 49 may be secured to the bus bars at any of the various positions where holes 51 are provided. Thus by properly positioning the conductor 49 I may obtain in the impedance loop 46 any of various predetermined normal impedance characteristics, the least impedance being obtained, of course, with the conductor 49 positioned at the extreme left hand side of the series of holes 51, and the greatest impedance being obtained with the conductor 49 in the position indicated by the broken line representation in Figure 2.

As is indicated in Figures 2 and 3 the variable impedance loop 46 may be advantageously used with the short-circuiting arrangement as provided in the embodiment of Figure 1, or with such other current regulating and controlling means, not shown, as may be found to be applicable.

It should now be apparent that I have accomplished the objects initially set forth. Through my invention I have provided the electric resistance welding art, and particularly the flash-butt welding classification of this art, with an extremely simple and inexpensive means of accurately and reliably controlling current flow to the weld. Welding equipment constructed according to the teachings of this invention is, of course, primary adapted for highly repetitive operations, but it will be understood that one skilled in the art may apply the principles disclosed herein to adapt the machines for various other uses. For example, it will be noted that, by the simple expedient of utilizing a plurality of short circuiting arrangements such as that disclosed in Figure 1 of the drawing, positioned at spaced intervals along the impedance loop, the electrical characteristics of the secondary circuit may be altered in predetermined graduated increments during a welding operation.

In the embodiments of my invention shown in Figures 2 and 3 of the drawing I have provided a novel secondary loop construction whereby the normal impedance characteristic of the apparatus may be adjusted to best suit the normal current flow requirements of the machine for any particular application thereof, and short-circuiting and/or heat controls, for example, may also be provided for additional current regulation. It will be noted, however, that such other controls as may be desired in addition to adjustable impedance loop need in many cases operate over a relatively narrow range only, since after making the proper adjustment of the impedance loop it may only be necessary to provide, for example, a slight increase in current for starting and a slight reduction for upsetting the workpieces. Thus, even if additional controls are found to be necessary or desirable, they may be of a relatively simple and inexpensive nature.

Having thus described my invention and illustrated by specific examples how the same may be advantageously used, what I claim as new, and desire to secure by Letters Patent is:

1. In electric resistance welding apparatus, a source of electrical power, a transformer having a primary adapted to be connected to said source, a work holding clamp adapted to hold and make electrical contact with a work piece, a low resistance conductor connecting said clamp and a secondary terminal of said transformer, a second work holding clamp adapted to hold and make electrical contact with a second work piece to be welded to said first work piece, a second low resistance conductor connecting said second clamp with the other secondary terminal of said transformer, said second conductor including a loop adapted to inductively impede the flow of current through said second conductor, and normally closed relatively non-inductive switching means adapted to short circuit said loop to thereby provide a relatively unimpeded path for the flow of current to the said work pieces.

2. Apparatus according to claim 1 further characterized by said switching means including a pair of contacts, at least one of which is movable, means connecting said contacts to said second conductor in such manner as to short circuit said loop, and means operative to move said contacts into and out of electrical contact.

3. Apparatus according to claim 2 further characterized by said means to move said contacts including a fluid operated actuating cylinder, the piston of which is connected to one of said contacts and is operative to move in response to fluid pressure applied to said cylinder, and a valve for controlling the direction of movement of said piston.

4. Apparatus according to claim 1 further characterized by fluid actuated means to move said clamps together under low pressure during flashing and under a higher pressure for upsetting, and means responsive to said higher pressure to cause said normally closed switching means to open.

5. Apparatus according to claim 1 further characterized by means to move said clamp together under low pressure during flashing and under higher pressure during upset, and means responsive to the application of said higher pressure to cause said normally closed switching means to open.

6. In electric resistance welding apparatus, a source of electric power, a pair of work holding clamps adapted to hold and make electrical contact with work pieces to be welded, conductors connecting each of said holding clamps with a terminal of said source, at least one of said conductors having a looped portion adapted to inductively impede the flow of welding current therethrough, and a relatively non-inductive normally closed switching means adapted to short circuit at least a portion of said loop to thereby eliminate the inductive impedance caused by the short-circuited portion of said loop.

7. Apparatus according to claim 6 further characterized by said normally closed switching means including a pair of relatively movable contacts, a fluid operated actuator to move at least one of said contacts, and valve means operative to control the direction of movement of said actuator.

8. Apparatus according to claim 6 further characterized by means to move said clamps together during a welding operation and means responsive to said movement to cause said normally closed switching means to open after a predetermined portion of said movement.

9. In electric resistance welding apparatus, a source of electric power, conducting members connecting said source with work pieces to be welded, at least one of said conducting members having a looped portion adapted to inductively impede the flow of current therethrough, and relatively non-inductive switching means adapted to short circuit at least a portion of said loop.

10. Apparatus according to claim 9 further characterized by means to move said work pieces together under pressure during a welding operation and means responsive to a predetermined pressure applied to said work pieces to cause said switching means to open to thereby divert the flow of current through said loop.

11. Apparatus according to claim 9 further characterized by means to move said work pieces together under pressure during a welding operation and means responsive to a predetermined movement of said work pieces to cause said switching means to open to thereby divert the flow of current in the short-circuited portion of said loop.

12. In electric resistance welding apparatus, a source of electric power, a pair of work holding clamps adapted to hold and make electrical contact with work pieces to be welded, conductors connecting each of said holding clamps with a terminal of said source, at least one of said conductors having variable inductive means interposed therein to inductively impede the flow of welding current therethrough, said variable inductive means comprising a loop having spaced substantially parallel side portions and means to connect said side portions at two or more points whereby two or more impedance characteristics are derived from said inductive means.

13. Apparatus according to claim 12 further characterized by said means to connect said side portions comprising a conductor rigidly connecting said side portions and forming an end of said loop, and a switching member adapted to connect said side portions to short circuit at least a portion of said loop.

14. Apparatus according to claim 13 further characterized by said conductor being adapted to be detachably secured to said side portions at two or more points therealong whereby the size of said loop may be increased or decreased.

15. Apparatus according to claim 12 further characterized by said means to connect said side portions comprising a conductor being adapted to be detachably secured to said side portions to form an end portion of said loop, said conductor being adapted to be connected at two or more points along said side portions whereby the size of said loop may be increased or decreased.

JOSEPH H. COOPER.

References Cited in the file of this patent

UNITED STATES PATENTS

| Number | Name | Date |
|---|---|---|
| 1,344,961 | Remington | June 29, 1920 |
| 2,570,548 | Hanna | Oct. 9, 1951 |

FOREIGN PATENTS

| Number | Country | Date |
|---|---|---|
| 45,533 | Sweden | July 24, 1916 |